United States Patent  [11] 3,628,310

| [72] | Inventor | John Howard Purnell |
| --- | --- | --- |
| | | Bishopston, Swansea, South Wales |
| [21] | Appl. No. | 759,970 |
| [22] | Filed | Sept. 16, 1968 |
| [45] | Patented | Dec. 21, 1971 |
| [73] | Assignee | The Foxboro Company |
| | | Foxboro, Mass. |
| [32] | Priority | Nov. 14, 1967 |
| [33] | | Great Britain |
| [31] | | 51,851/67 |

[54] METHOD AND APPARATUS FOR EMPLOYING SOLUTION AND ADSORPTION CHARACTERISTICS OF SOLIDS AND LIQUIDS FOR THE BALANCING OF TEMPERATURE DEPENDENCE OF SOLUBILITY AND ADSORBABILITY OF VAPORS AND GASES
13 Claims, 15 Drawing Figs.

[52] U.S. Cl. .................................................... 55/67
[51] Int. Cl. ........................................... B01d 15/08
[50] Field of Search............................................ 73/23.1; 55/67, 197, 386; 210/31, 198

[56] References Cited
OTHER REFERENCES

Gas Chromstography, J. Howard Purnell, 1962, John Wiley and Sons Inc.

*Primary Examiner*—J. L. De Cesare
*Attorney*—David E. Hoppe

ABSTRACT: Method and apparatus for balancing over a selected range the temperature-dependence of a characteristic of a chemical system exhibiting mass transfer of species through and between phases over a selected range by introduction of a countervailing temperature effect exhibited by a substance or a mixture of substances having a temperature range between phase or species changes for the purpose of achieving a result exhibiting a predetermined and restricted temperature dependence.

INVENTOR.
JOHN HOWARD PURNELL
BY David E. Hopper
ATTORNEY

*INVENTOR.*
JOHN HOWARD PURNELL

BY David E. Hopper

ATTORNEY

INVENTOR.
JOHN HOWARD PURNELL
BY David E. Hoppe
ATTORNEY 3,628,310

METHOD AND APPARATUS FOR EMPLOYING SOLUTION AND ADSORPTION CHARACTERISTICS OF SOLIDS AND LIQUIDS FOR THE BALANCING OF TEMPERATURE DEPENDENCE OF SOLUBILITY AND ADSORBABILITY OF VAPORS AND GASES

This invention relates to temperature balancing of solution and adsorption phenomena generally, and in particular to temperature balancing of solution and adsorption phenomena in industrial and laboratory chemical systems.

The adsorption of liquids and gases on the surfaces of solid bodies, and the solution of gases and liquids in other liquids are related physicochemical phenomena which are usually temperature dependent. That is, the amount of substances that can be adsorbed to bodies or dissolved in liquids is a function of the temperatures of the various components contributing to the physicochemical process taking place. By way of definition, the extent to which a substance can be adsorbed to a body or dissolved in a liquid is scientifically described by the quantity designated the partition coefficient. The partition coefficient equals the ratio of the concentration of a substance in the phase in which it is initially present to that on a solid surface or in a solution when equilibrium between phases is achieved. The partition coefficient has fundamental thermodynamic significance and is a term commonly used in the chemical art. See Gas Chromatography, by Dr. J. Howard Purnell, 1962; John Wiley and Sons, Inc.

The phenomena of solution or adsorption are frequently employed in laboratory and process applications. In many of these applications, particularly in chromatographic separation, the inherent temperature dependence of the solution and adsorption phenomena may appreciably affect the functioning of the physicochemical system. For example, it has been common in chromatographic analysis to rigidly maintain the chromatographic system, or a portion thereof, within a close temperature tolerance. In this manner, the results of the analysis are kept more uniform, simplifying interpretation. For highly accurate isothermal laboratory analysis, the chromatographic column temperature must be maintained within a fraction of a degree Fahrenheit; this is extremely difficult to accomplish as a practical matter. In online analysis of components in a process stream, the practical difficulties multiply, and the expense of maintaining the analytical system within the required temperature tolerance is high.

Again, in larger scale chromatographic applications, considerable temperature variations within the column may develop on account of the sorption-desorption processes occurring and the generally reduced thermal properties of columns. These effects lead to poor system performance; means for counteracting these effects would be very advantageous.

It would also be advantageous if chromatographic procedures and the design of equipment could be both simplified and improved as would be the case if it were possible to operate under a wider latitude of operating temperatures, than is conventionally the present practice in isothermal work. For example, a relaxation of the temperature tolerance would increase equipment flexibility with respect to the varying temperature of the substances to be analyzed, and the properties of the gas carrier employed therewith. Again, in the case of large scale (preparative or plant scale) systems, the improvement in column behavior attendant upon elimination of the effects of column temperature is highly desirable.

Chemical substances to which other substances are adsorbed or in which other substances are dissolved are referred to herein as solvents. In the method of the invention, a first solvent exhibiting a temperature characteristic wherein its ability to dissolve or adsorb some gas or vapor decreases with increasing temperature is balanced by a second countervailing solvent exhibiting a temperature characteristic wherein its ability to dissolve or adsorb the same gas or vapor increases with decreasing temperature. This balance may be adjusted to produce a mutual cancellation of the temperature characteristics of the first and second solvents. The overall operation thereby exhibits results in which the solubility or adsorbability of the gas or vapor is apparently relatively or entirely temperature-independent over a particular latitude of temperatures.

Briefly stated, the temperature balancing of the invention is achieved using a solvent exhibiting a phase or species change over a selectively extended temperature range, in a combination with a conventional solvent exhibiting an opposing temperature characteristic over this range. The proportions of the two solvents required for balancing their temperature characteristics is predetermined; a column system incorporating both solvents operates to effectively combine the opposing temperature effects so as to achieve mutual cancellation thereof over the selectively extended temperature range. By suitable choice of the two solvents, it is possible to achieve the temperature balancing effect around any desired absolute temperature which is thereby the center of the temperature range affording the desired balancing.

Broadly the method of the invention involves the maintenance of an apparent constant partition coefficient. It may therefore apply in any system comprising gases, liquids or solids in any combination.

Thus, although the examples cited relate to gas chromatography the method of temperature balancing may apply in all forms of partitioning systems such as, for example, liquid-liquid chromatography, countercurrent extraction and the like. It appears that there may be no fully accepted generic terms covering the similar aspects of the process modes commonly referred to as adsorption, partitioning, and so forth. To avoid indefiniteness or uncertainty, therefore, the term "sorbent" has been adopted for use herein to mean any type of material which temporarily retains a flowable substance, whether such retention be the result of adsorption, dissolving, or any other physicochemical phenomenon. Similarly, the term "sorb" is used as the verb for describing such retaining action, whether it is specifically adsorption, partitioning, or any other physicochemical phenomenon.

The advantages of the invention will be apparent from the specification below taken in conjunction with the several drawings, in which.

Generally, solubility and adsorbability of gases and vapors increase as the temperature of the chemical system is lowered. It is conventional to illustrate this relationship by plotting a graph between logarithmic value of the amount of gas or vapor dissolved or adsorbed and the reciprocal of the absolute temperature of the chemical system. Such a plot is generally a straight line having a positive slope, such as that illustrated in FIG. 1; that is, the amount of gas or vapor dissolved or adsorbed increases with the reciprocal of absolute temperature. These plots may be made in terms of natural logarithms or logarithms to the base 10, the latter being commonly employed although basic theory is in terms of natural logarithms.

Figure 1:
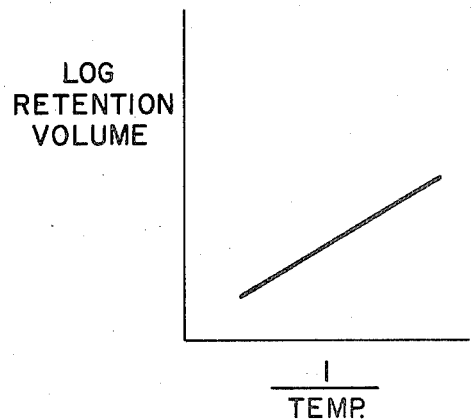
FIG. 1 represents a plot of the logarithm of retention volume against the reciprocal of temperature for a chemical system, such as a gas chromatographic column.

With more particular reference to gas chromatography, FIG. 1 represents a graphical plot of the logarithm to the base 10 of the net retention volume for the elution of a gas or vapor through a conventional column against the reciprocal of column temperature, the slope of this plot being designated as positive. The retention volume is the product of the time taken for a gas or vapor sample to pass through a column and the average carrier gas flow rate. The net retention volume is defined as the gross retention volume (total carrier gas flow from sample injection to peak output maximum) minus the dead-volume of the column and auxiliary equipment. These definitions also apply to other forms of chromatography, for example, to liquid-liquid chromatography wherein the sample may be solid or liquid and the carrier is a liquid instead of a gas. The net retention volume moreover may also be defined as equal to the product of the partition coefficient (a measure of the amount of substance dissolved or adsorbed in the chromatographically active solvent) and the volume of the solvent present in the column. Net retention volume is the most useful term for describing the operation of any chromatographic arrangement operated in any mode of chromatography, being a descriptive term normally independent of the carrier fluid flow rate, and hence the particular time required for passage of a solute (substance being dissolved or adsorbed) through the chromatographic column. A detailed analysis of column operation may be found in Gas Chromatography, by Dr. J. Howard Purnell, 1962; John Wiley and Sons, Inc.

The method of the invention may be employed as described to balance out the temperature dependence of the conventional column, and in addition may also operate to render the column discrimination and separation efficiencies less dependent upon temperature effects.

Pure solids generally undergo an abrupt phase transition at a particular temperature, that is, they melt sharply at a unique temperature. If a pure substance is employed as the immobile phase (solvent) in a gas chromatographic column, at temperatures below the melting point of the solvent, retention of gaseous substance is a result of adsorption of gas on the solvent surface. As the temperature is raised toward the melting point of the pure solid solvent, the net retention volume of the gas chromatographic system decreases in accordance with the general temperature dependent relationship illustrated in FIG. 1. When the melting point of the pure solid solvent is reached, an abrupt phase change occurs in which the column changes from a solid solvent system to a liquid solvent system. The retention process thereby changes from an adsorption process to a solution process at this temperature, and the chromatographic characteristics may be expected to exhibit a marked displacement. As the temperature of the chromatographic column is further increased above the melting point of the now totally liquefied pure liquid solvent, the net retention volume continues to decrease owing to the general temperature dependent relationship illustrated in FIG. 1.

Figure 2:
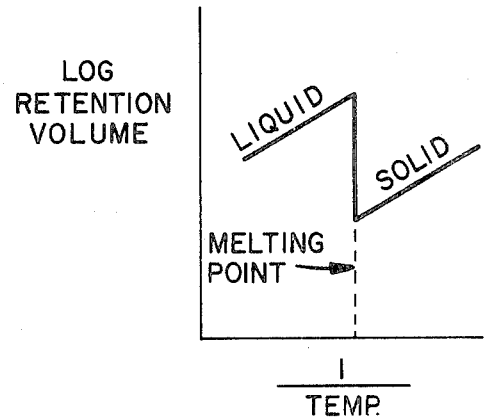
FIG. 2 represents a plot of the logarithm of retention volume against the reciprocal of temperature for a melting pure solvent system in which retention volume abruptly increases as the solvent melts.
Figure 3:
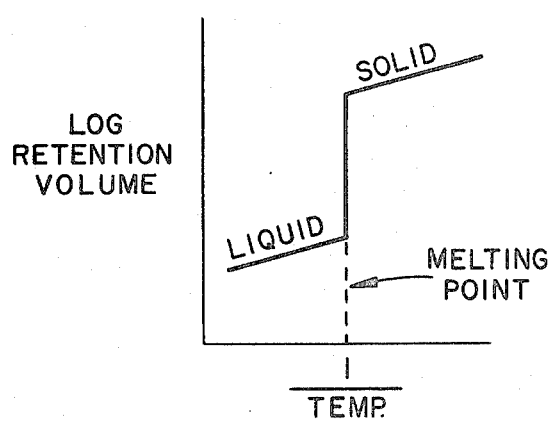
FIG. 3 represents a plot of the logarithm of retention volume against the reciprocal of temperature for a melting pure solvent system in which retention volume abruptly decreases as the solvent melts.
Figure 4:
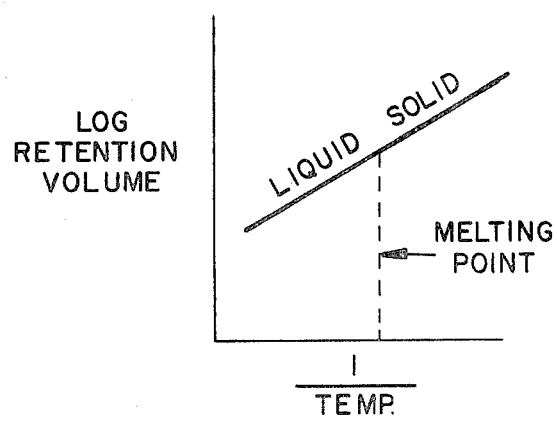
FIG. 4 represents a plot of the logarithm of retention volume against the reciprocal of temperature for a melting pure solvent system in which retention volume exhibits no abrupt change as the solvent passes through a phase change at the melting point.

Depending upon the adsorbability of the solute in the solid phase of the solvent as compared with the solubility of the solute in the liquid phase of the solvent, the retention volume relationship to temperature during the sequence described above may be represented by FIGS. 2, 3 or 4. These figures are somewhat idealized, not precisely duplicating the actual plot curvatures of the physicochemical processes, but they present abstractions convenient for purposes of explanation. FIG. 2 represents the most likely case to be encountered in practice, namely the situation in which the net retention volume abruptly increases as the chromatographic system passes through its melting point with temperature increasing. This assumes that for most pure substances solubility of the solute increases in the liquid phase of the solvent as compared with adsorbability of the solute in the solid phase of the solvent. FIG. 3 represents a chromatographic system in which the net retention volume abruptly decreases as the solvent passes through its melting point with temperature increasing. The situation of FIG. 3 is not probable, on the basis of the generality of the assumption above. FIG. 4 shows the situation in which the net retention volume of the chromatographic system exhibits no abrupt change as the solvent passes through a phase change, thereby exhibiting a simple relationship similar to that plotted in FIG. 1. The situation of FIG. 4 appears unlikely to arise in practice, it being expected that a differential of relative solubility exists as between a liquid and a solid phase of the solvent. If systems of the types illustrated in FIGS. 3 and 4 do exist, they are not commonly known.

Figure 5:
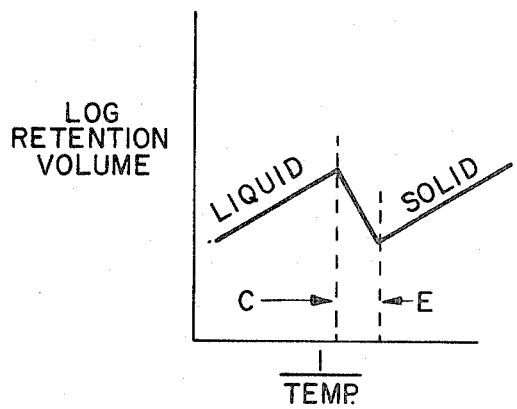
FIG. 5 represents a plot of the logarithm of retention volume against the reciprocal of temperature for a solvent system having an extended melting range and exhibiting increasing retention volumes as the solvent progressively melts.

If instead of employing a pure solvent having an abrupt phase change at a single temperature, a solvent is used which has a definite range of temperatures over which the phase change progresses, a relationship between retention volume and temperature such as ideally plotted in FIG. 5 may result. The negative slope of the plot in the phase transition zone between the liquid and the solid phase transition zone between the liquid and the solid phases as represented in FIG. 5 can be achieved with a solvent having characteristics as represented in FIG. 2, but cannot be achieved with any solvents having characteristics represented in FIGS. 3 and 4.

Figure 5A:
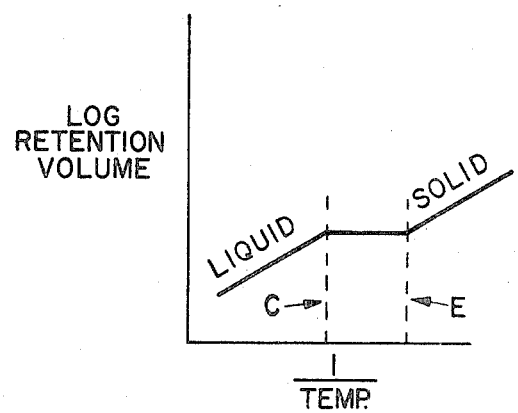
FIG. 5A represents a plot of the logarithm of retention volume against the reciprocal of temperature for a solvent system having an extended melting range but exhibiting no change in retention volume as the solvent progresses through the range of temperatures defining its phase transition.

Referring to the solvent system represented in FIG. 5, for a condition of continually increasing absolute temperature from zero, the net retention volume of some substance passing through the chromatographic column decreases continually until the phase transition commences (thaw point), then retention volume increases through the finite range of temperatures defining the phase transition, and again decreases as temperatures rise above the melting point. A special case represented in FIG. 5A may be a possibility, in which the net retention volume is stable as the system passes through the finite range of temperatures defining the phase transition; it is possible that such behavior may be observed, but it is anticipated that it will not be at all common.

Figure 6:
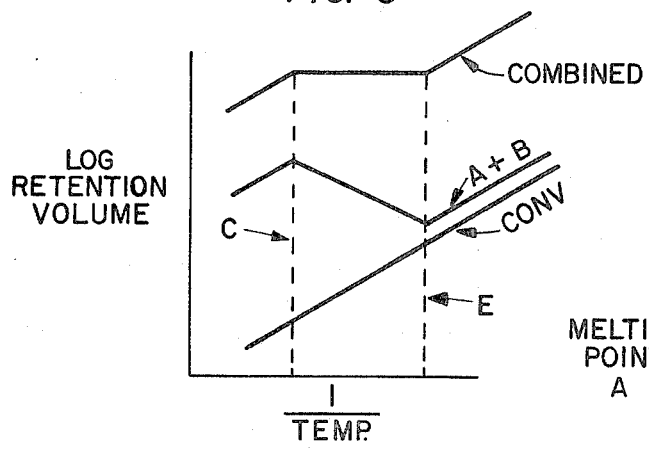
FIG. 6 represents plots of the logarithm of retention volume against the reciprocal of temperature for a conventional, solvent system, a balancing solvent system having an extended phase transition, and the resultant combined system.

If a solvent system exhibits the relationship between net retention volume and temperature represented by the plot of FIG. 5, that solvent system could be employed to provide a counterbalancing temperature effect in combination with a conventional temperature-dependent chromatographic system. Such a solvent system having the characteristics of FIG. 5 is to be made in some way to cooperate with a conventional chromatographic solvent system having the characteristics shown in FIG. 1, so that a balance as depicted in the combined plot of FIG. 6 will result in the production of a stable retention volume over the temperature range of interest. FIG. 6 illustrates in idealized form the conventional plot, the plot of the balancing solvent system, and the resultant plot of a combined system which exhibits a constant value of the apparent net retention volume of some gas or vapor over a range of temperatures corresponding to the extended phase transition of the balancing solvent system.

Figure 7:
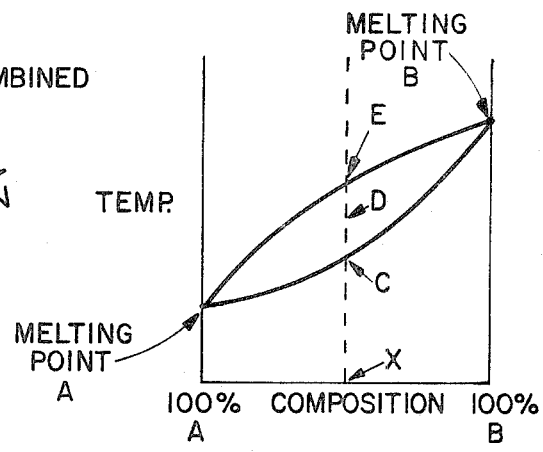
FIG. 7 represents a plot of temperature against percentage of composition illustrating the phase transition boundaries of a mixture of a type for which it is usual to give the name solid solution.

There are many mixtures of substances that will behave in the manner ideally illustrated in FIG. 5. A chemical mixture is a system of two or more ingredients which do not necessarily bear a fixed proportion to one another and which, though thoroughly intermingled, are conceived as retaining a separate existence. A finite temperature range of melting characterizes practically every mixture of substances. Phase diagrams, which are plots of some variable such as pressure or temperature against composition, take many forms. Depending on their form they are named differently, but irrespective of this, they share the common property of an extended melting range. Probably, the simplest cases known are those termed eutectic mixtures and solid solutions, respectively. Diagrammatically, such a mixture as the latter, gives a phase diagram as in FIG. 7. Referring to FIG. 7, a plot of temperature against composition is shown for a mixture of two substances A and B. The melting point of substance A is a temperature relatively lower than the melting point of substance B. Mixtures of substances A and B exhibit a finite range of phase transition, the limiting temperatures being affected by the relative proportions of the substances A and B. For a given percentage mixture corresponding to point X, as temperature is increased, a first point C (thaw point) is reached at which some amount of liquid becomes present. On further increase in temperature, illustratively at point D, both solid and liquid phases are present. When the temperature reaches point E (melting point) all of the mixture is liquefied, that is to say, completely melted. Thus, over the interval of temperatures falling between points C and E, the mixture changes from a complete solid to a complete liquid. During the transition from point C to E, a mass transfer exists between the solid phase and the liquid phase. Analogous behavior will be observed for mixtures containing more than two components.

The operation of a column composed of a mixture such as described above may be broadly described in the following terms. In the region of the phase transition, the net retention volume of a gas or vapor increases with increasing temperature although (i) the amount of adsorbing solid diminishes and, (ii) the contribution to retention volume from both solid and liquid diminishes in the fashion described earlier in connection with FIG. 1. However, the contribution to net retention volume arising from the increased volume of liquid becoming present more than counterbalances the losses of retention volume due to (i) and (ii) and so there is an overall increase in the net retention volume with increasing temperature.

Mixtures of two or more components are classified scientifically under many names according to their behavior, but, in general, a finite temperature melting range will be observed for most ratios of the components making up the mixture. The extent of the temperature range will depend on the chemical nature as well as the percentage of the components of the mixture, and to some extent on the prevailing pressure although the effect of this is small except at very high pressures.

There may be chemical systems other than mixtures which may be advantageously employed in the method of the invention. For example, the class of pure compounds known loosely as liquid crystals may be expected to display the temperature balancing behavior described previously. It is to be expected that certain colloidal systems will also show an extended melting range such as may be employed in the practice of the invention. Again, the situation in which a solid compound progressively decomposes partially with change of temperature to yield more than one solid, or more than one liquid, or a mixture of solid and liquid. The decomposing compound may be either a solid or a liquid.

As may be seen from FIG. 7, the central absolute temperature over which the balancing temperature effect appears may be varied by changing the ratio of the components of the mixture.

Figure 8:
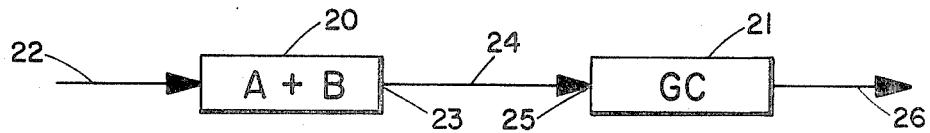
FIG. 8 illustrates in block diagram form a serial arrangement of a conventional column with a balancing column for achieving a temperature independent result over a temperature range of interest.

In practice, one balancing system may be defined by an arrangement of serial columns as shown in FIG. 8. A first column 20 contains a mixture of materials A and B defining a finite melting range, and the second column 21 contains a conventional chromatographic solvent or adsorbent. A gas for analysis with its carrier is applied to input 22 of column 20 emerging at output 23 thereof, and being transferred therefrom by line 24 to input 25 of conventional column 21. The output 26 of the conventional column 21 represents the temperature-balanced result of the entire system. The system can equally well be operated with the column 21 ahead of the column 20 in the direction of gas or fluid flow.

Figure 9:
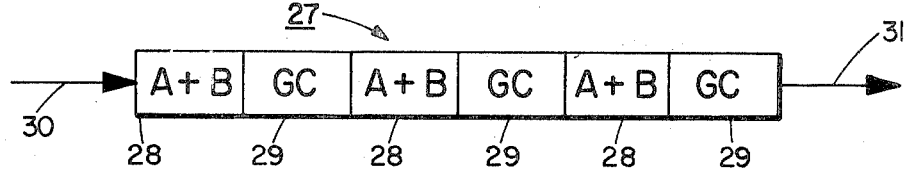
FIG. 9 illustrates in block diagram form an arrangement of alternating plugs of a conventional solvent system and a balancing solvent system in a single column.

Another arrangement is shown in FIG. 9 which represents a single striated balanced column 27 having alternate plugs 28 of mixture A and B and plugs 29 of conventional chromatographic solvent or adsorbent. Such a system reduces to a simple input 30 and temperature-balanced output 31 of the column.

If the balancing solvent system used to achieve the negative slope of FIG. 5 is not soluble in, does not chemically react with, and does not exhibit any other mutual effect with the conventional chromatographic solvent system, the balancing solvent system may be mixed with the conventional chromatographic solvent system and the combination used on a common inert substrate support material. If, on the other hand, these conditions are not fully met, it is possible that separate batches of substrate may be respectively coated by these two solvent systems and the coated substrates mixed and used in filling a single column. The possibility of interaction between the two solvent systems should be checked and adequate physical separation allowed.

A further alternative is to employ an active solid support which would function as both a conventional solvent and a support. Such a column has affinities with the composite systems described above but is advantageous in its simplicity since in all respects other than its apparent solvent power, it corresponds to a conventional column. An adsorptive solid, or in the case of a capillary or tubular column an active film, may be used. This solid or film will show temperature dependent retention volumes for gases and vapors of the conventional kind. A column containing such a material, which would act both as conventional solvent and as the support for the temperature balancing solvent, would produce the desired temperature balancing effect since there would generally be some active solid exposed to the vapor or gas sample. The method of the invention may be employed in analogous procedures with the types of chromatographic columns variously described as capillary, tubular, open tube or loosely packed and the like.

A preferred approach to selecting a particularly balancing system may be taken by the following steps.

First, the retention characteristics for selected gases and vapors of a number of readily available and widely used conventional column solvents must be determined, either practically or from the literature. A study of existing literature information regarding phase equilibrium data for mixtures or a direct experimental study of likely systems is then to be conducted and favorable systems chosen for experimental study. Systems are favorable if the phase transitions occur at temperatures which are of primary chromatographic interest. Temperatures in the range of 0° C. to 400° C. approximately are considered useful. Also, it is favorable for these systems if the phase transition loop is wide but not excessively so; if the rate of change of volume of liquid in the mixture is not great enough it cannot overwhelm the loss of retention volume arising from the diminution of the amount of solid and the normal reduction of solubility due to temperature increase. The wider the temperature span, in general, the smaller is the rate of increase of liquid volume with temperature. As a consequence, there is some critical span of temperature beyond which the balancing method cannot produce the desired result. Generally, a maximum span of 30° C. is sufficient for most chromatographic applications since this allows, for example, a chromatograph to be operated anywhere at room temperature practically independent of ambient temperature variation despite normal season change. The material making up the solvent systems should be thermally stable and readily available in reasonably pure state.

Having decided on a number of such solvent systems from the literature and available data, a study of the retention volume characteristics as a function of temperature at some chosen composition of the mixture is carried out. One employs here a number of vapors or gases which are regarded as representative of chromatographic practice, for example, a hydrocarbon, an aromatic or chlorinated compound, an alcohol, a ketone, an ester or the like. The requisite chromatographic plots of log retention volumes against temperature are constructed and the calculations necessary for further work are carried out at described below. Following this, the composite columns are made up according to the calculations and the composite retention volume plot observed experimentally. In the event that the plot is not quite, in practice, what was predicted theoretically, quantitative readjustment is made for this deviation by altering the weight ratio of the solvent system; a substantially completely temperature-insensitive balancing system over some range may be thereby obtained. This procedure could be carried out for many systems and complete tabulated list of balancing systems for any given absolute temperature with the corresponding temperature span compiled for future use. Theoretically the number of such possible systems is very large. The practical number of such systems is probably limited since it is found that relatively few such systems can be readily obtained, cheaply, from the different available manufacturers and suppliers. In addition, it is to be noted that although different systems might be expected to perform somewhat differently, their performance is likely to be relatively similar in so many instances that a few systems can provide for a substantially complete spectrum of expected and desired performances.

Given a pair of columns, the first containing a conventional solvent system and the second containing a balancing solvent such as for example a particular component mixture A+B, it is possible to calculate the required relative solvent weights to be employed in each of the first and second columns corresponding to an optimum temperature balancing condition in a chromatographic arrangement.

This ratio will be a sufficient balancing determinant, in that the objective of otimizing the temperature-independent portion C to E of the plot of the combined systems ideally illustrated in FIG. 6 is effected by this ratio.

Such calculations may take as a start the existence of a first chromatographic column (1) containing a conventional solvent system (S), and a second chromatographic column (2) containing a solvent system illustratively composed of a temperature balancing mixture (A+B). By experimental or other means, the retention volume of some gas or vapor for each solvent system is ascertained over the temperature range of interest. Retention volume may be expressed in terms of retention volume per gram of solvent ($V_g$) (specific retention volume). The graph of FIG. 6 illustrates a plot of the logarithm of retention volume of gas or vapor against the reciprocal of temperature (T) for the conventional solvent system (S) as well as for the balancing solvent system (A+B). The plots of FIG. 6 may be more precisely defined quantitatively in terms of slope and ordinate displacement by the use of the following expressions:

$ln\ V_{g1} = a'/T + b'$ (Solvent system S)

$ln\ V_{g2} = c'/T + d'$ (Solvent system A+B)

wherein for the gas or vapor in question for each solvent system, the natural logarithm of the retention volume is equal to the reciprocal of the absolute temperature; proportionality coefficients ($a'$, $c'$) and displacement coefficients ($b'$, $d'$), relate both sides of the equation quantitatively. These proportionality and displacement coefficients may readily be determined experimentally, as described below.

Then, over the temperature range of interest C to E, the sum of the respective net retention volumes for the gas or vapor in question for the solvent systems of the first and second columns may be expressed, taking antilogarithms of the above equations:

$$V_{g1} + V_{g2} = e^{b'} e^{a'/T} + e^{d'} e^{c'/T}$$

where $e$ is the base of the natural logarithm.

In general, net retention volume is proportional to the weight of the solvent, so that the overall total net retention volume ($V_R$) of the first and second columns together is equal to the sum of the respective net retention volumes of the two columns in which the sum takes into account the weights of solvent in each of the columns. This sum may be expressed:

$$V_R = w_1 V_{g1} + w_2 V_{g2} = w_1 e^{b'} e^{a'/T} + w_2 e^{d'} e^{c'/T}$$

where $w_1$ and $w_2$ are the respective weights of the solvent system in the first and second columns respectively.

To find the condition where the combined net retention volume of the two columns for any gas or vapor remains the same over a change in temperature in the range of interest, it is required to differentiate the expression for $V_R$ with respect to $1/T$ and set the result equal to zero. Then, $$-a' w_1 e^{b'} e^{a'/T} = c' w_2 e^{d'} e^{c'/T}$$

which converts to:

$$w_1/w_2 = (-c'/a') e^{(d'-b')} e^{(c'-a')/T} \quad (I)$$

This equation may now be transformed into the form more practical for computation $$w_1/w_2 = -(c/a) 10^{(d-b)} 10^{(c-a)/T} \quad (II)$$

where the new coefficients ($a$, $b$, $c$, $d$) are related to those ($a'$, $b'$, $c'$, $d'$) in equation (I) by the simple factor of 1/2.3, for example, $a=a'/2.3$, etc.

Thus, to find the ratio of the weights of solvents to be employed in the respective columns that will properly produce an optimum temperature balancing effect, it is only necessary to evaluate the coefficients $a$, $b$, $c$ and $d$ on the basis of the experimental test data for the respective solvent systems. These coefficients can be measured directly from the experimental graphs of logarithm of $V_g$ against $1/T$. For example, $$a = (\log V_g^{T_1} - \log V_g^{T_2}) / \left(\frac{1}{T_1} - \frac{1}{T_2}\right)$$

where $T_1$ and $T_2$ designate two temperatures in the region of interest and $V_g^{T_1}$ and $V_g^{T_2}$ are the corresponding specific retention volumes for a given gas or vapor. By determining the value of $a$, any value of $\log v_g$ with its corresponding value of $1/T$ allows calculation of $b$. Similarly, $c$ and $d$ may be evaluated.

To produce a balanced system, we must:

a. Make a column of solvent 1 and another of solvent 2, each containing a known weight of solvent.
b. Measure, for each $V_g$ for some gases or vapors as a function of temperature.
c. Plot graphs of log $V_g$ versus $1/T$.
d. Evaluate the coefficients $a, b, c, d$ of equation (II).
e. Calculate $w_1/w_2$ via equation (II) and construct a column system with solvents in this ratio. The absolute values of $w_1$ and $w_2$ are chosen to give a desired retention volume, i.e., analysis time.

Practical Example:

Two test columns were constructed and benzene and acetone used as test vapors; the columns were:

TABLE I.—TEST COLUMNS

| Column designation | Length, inches | Diameter | Packing, percent by weight | Weight solvent, grams |
|---|---|---|---|---|
| X | 52 | ¼″ (o.d.) | [1] 25 | 1.198 |
| Y | 26 | ¼″ (o.d.), 3.1 mm. (i.d.) | [2] 20 | [3] 0.131 |

[1] Squalane on 60–80 mesh firebrick.
[2] Solvent mix on 60–80 mesh firebrick.
[3] Methylstearate plus 0.306 grams n-octadecanol (single phase mixture).

Figure 10:
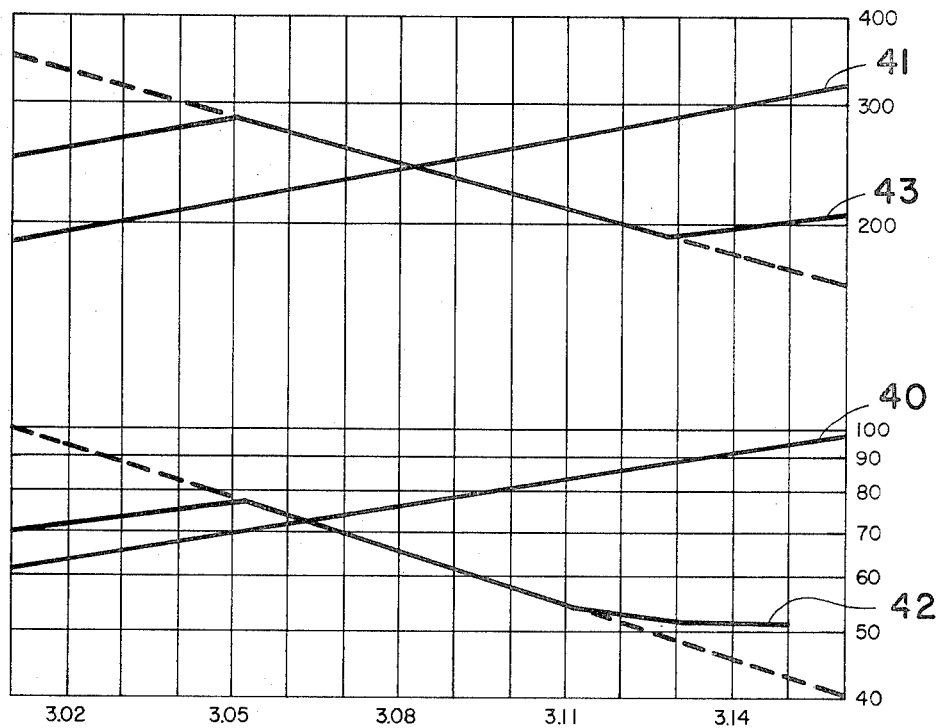
FIG. 10 represents plots of experimentally determined retention volumes for each of two vapors with two columns X and Y.

Plots of the specific retentions (in milliliters of carrier gas) are shown in FIG. 10, plots 40, 41, 42, 43. Plot 40 represents the data for acetone eluted from squalane (column X, Table I); plot 41 represents similar data for benzene eluted from the same column X; plot 42 represents the data for acetone eluted from the methyl stearate/n-octadecanol (column Y, table I); plot 43 represents the data for benzene eluted from the same column Y.

Values of coefficients $a, b, c, d$ evaluated from these plots are quoted in table II.

TABLE II.—DATA EVALUATED FROM FIGURE 10

| | a | b | c | d |
|---|---|---|---|---|
| Benzene data plots 1B and 2B | $1.483 \times 10^3$ | $-2.1935$ | $-2.178 \times 10^3$ | 9.0935 |
| Acetone data plots 1A and 2A | $1.369 \times 10^3$ | $-2.3410$ | $-2.506 \times 10^3$ | 9.5351 |

As a check to show how well the data may be fitted, let us calculate $V_g$ for acetone on squalane (Column X) at $10^3/T = 3.02$.

$\log V_g = (1.369 \times 10^3) \times (3.02 \times 10^{-3}) - 2.3410$
$= 1.7947$
$V_g = 62.33$ Plot 40 yields 62.3.

Predictions of the test results:

As seen from equation (II) the ratio $w_1/w_2$ is a slight function of temperature, hence:
i. we can never realize the whole temperature range of the "negative slope" region;
ii. the available range will differ slightly from vapor to vapor or gas to gas.

As an example, thus, we take a value of $10^3/T$ in the middle of the range indicated in FIG. 10.

From the data of table II we then calculate:
$$1.6 < w_1/w_2 < 1.7$$
as a suitable combination.

We can now test the three linear combinations of substrate:
a. Series columns;
b. Striated (A:B:A:B, etc.) columns;
c. Composite substrate (A+B in physical mixture on said support).

a) Series Column

A pair of columns X+Z with solvents in the ratio 1.7, squalane (column X) and methyl stearate + n-octadecanol (column Z), were constructed (details in table III). No attempt was made to compensate pressure compressibility, i.e., the column on the upstream side works over a different inlet to outlet pressure ratio $(p_i/p_o)$ to that on the downstream side. (Note our data of FIG. 10 are corrected to $p_i/p_o=1$ to allow proper comparison.) The reason is that although we can calculate the effect and its compensation exactly, it is easier to determine it by practice. Thus, we can expect some curvature at each end of the log $V_g$ versus $1/T$ plot for the series pair.

Figure 11:
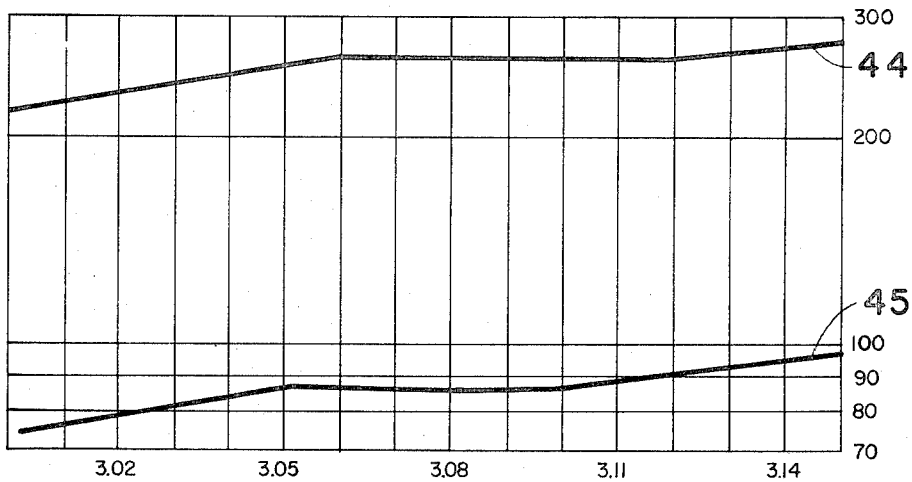
FIG. 11 represents plots of experimentally determined retention volumes for each of two vapors with a series combination of columns X and Z.

The results obtained are shown in FIG. 11. In FIG. 11, plot 44 represents the retention volumes for the elution of benzene from the series combination of Columns X+Z (tables I and III); plot 45 represents the retention volume of the elution of acetone from the same series combination X+Z.

It is seen that over the range $1/T=(3.05$ to $3.09) \times 10^{-3}$ both acetone and benzene have essentially temperature invariant retention volumes. This temperature range corresponds to $51°-56°$ C.

b) Striated columns

For this test the column W was constructed (see also table III).

Figure 12:
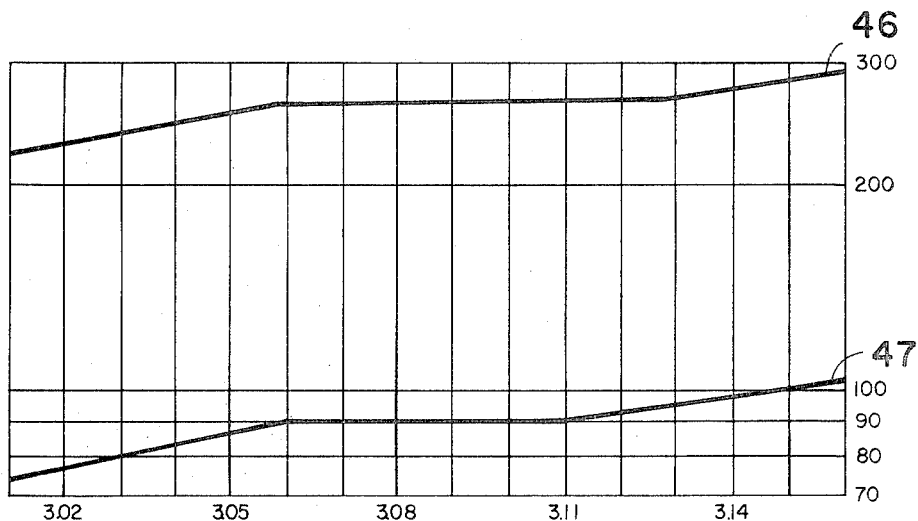
FIG. 12 represents plots of experimentally determined retention volumes for each of two vapors with a stricted column W.

Experimental data obtained are plotted in FIG. 12. In FIG. 12, plot 46 represents the retention volumes for the elution of benzene from column W (table III) and plot 47 represents similar data for the elution of acetone from the same column W. We see that the retention volumes of both acetone and benzene are effectively temperature independent over the range $$1/T = (3.06 \text{ to } 3.11) \times 10^{-3}$$

i.e., $49°-54°$ C. Again, a $5°$ C. range but shifted slightly from that of (a) because of compressibility differences (it is less important as a correction in striation).

Composite (intermixed) columns.

For this test a column was constructed by preparing separately the squalane packing and the methyl stearate/n-octadecanol packing and then thoroughly dry-mixing. The mix was then used as a simple packing to fill column V (table III).

Figure 13:
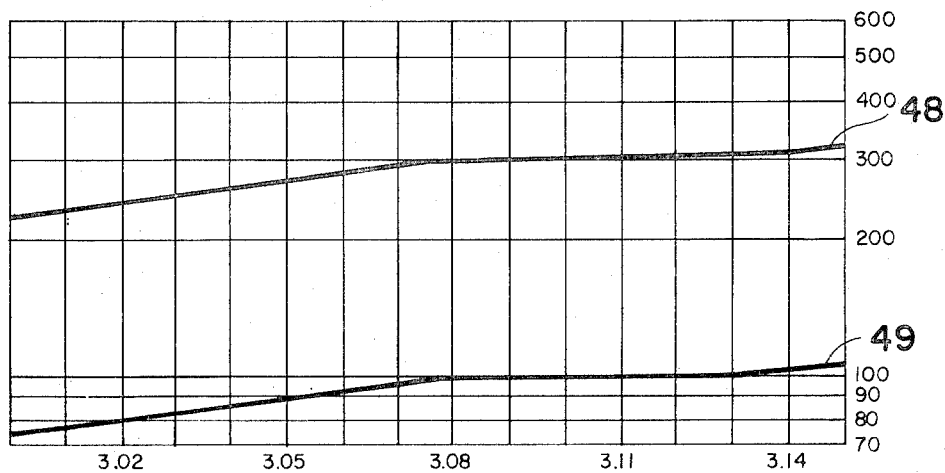
FIG. 13 represent plots of experimentally determined retention volumes for each of two vapors with a composite column V.

The experimental data are plotted in FIG. 13. In FIG. 13, plot 48 represents the retention volumes for benzenes eluted from column V (table III), plot 49 represents similar data for elution of acetone from the same column V. We see a temperature invariant range covering both benzene and acetone from 3.08 to $3.135) \times 10^{-3}$ at least, i.e., $44°$ to $52°$ C., that is, at least $6°$ C.

Figure 14:
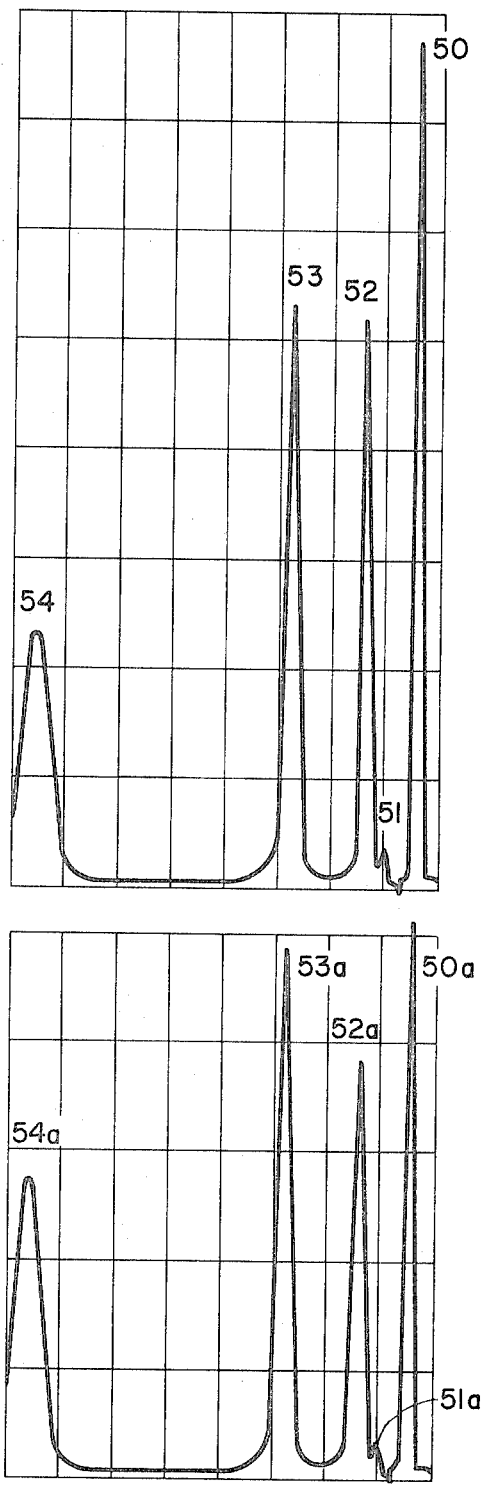
FIG. 14 illustrates experimentally obtained comparative chromatograms obtained at two different temperatures.

The realization of this temperature compensation in practice is shown in FIG. 14 where chromatograms of mixtures of air (50 and 50a), isopentane (51 and 51a), n-pentane (52 and 52a), acetone (53 and 53a) and benzene (54 and 54a), obtained at $44°$ C. (upper) and $51°$ C. (lower), respectively, with column V are illustrated.

Conclusions:

We have proved conclusively that all three "in line" arrangements work and that our theory is basically correct. On present evidence we can find no scientific advantage for any particular one of these methods except the slight one that, for composite columns, there is no carrier gas compressibility compensation needed at all. On practical grounds, one or other may be preferred depending on circumstances.

To illustrate the generality of the invention, FIG. 14 shows in addition to the test substances benzene and acetone the inclusion in the chromatograms of n-pentane and iso-pentane. For acetone and benzene the $\Delta V_{R12}$ was under ½ percent over the temperature range; the squalane column X, uncompensated, would have shown a $\Delta V_{R12} = 4.5$ percent. It is clear that the nontest substances, n-pentane and iso-pentane, are equally well compensated.

An alternative method of calculation of the $w_1/w_2$ ratio is as follows. If the respective retention volumes for the first and second columns are experimentally known for at least two temperatures in the range of interest, the appropriate ratio of column weights to achieve temperature balancing may be TABLE III.—Compensated column systems, constructional details

| Columns | | | $w_1/w_2$ |
|---|---|---|---|
| Z plus X (series) | 32" long, ¼" (o.d.), 3.1 mm. (i.d.). | 0.7487 g. of methyl stearate/n-octadecanol in ratio 3:7 (construction of Column Z) (see Table I for Column X). | 1.70 |
| W (striated) | 45" long, ¼" (o.d.), 3.1 mm. (i.d.). | (i) 2.624 g. of packing containing 0.4373 g. methyl stearate/n-octadecanol (3:7 by weight). (ii) 3.723 g. of packing containing 0.744 g. Squalane (i) and (ii) packing in 20 equivalent (approximate) alternating plugs. | 1.70 |
| V (composite) | 45" long, ¼" (o.d.) 3.1 mm. (i.d.). | 2.624 g. of packing containing 0.4373 g. methyl stearate/n-octadecanol (3:7 by weight) mixed with 3.723 g. of packing containing 0.744 g. Squalane. | 1.70 | readily calculated by means of simultaneous equations. That is, since $w_1 V_{g1} = w_2 V_{g2} = V_R$, this formula must then be made equal to itself at both first and second temperatures $T_1$ and $T_2$ which span the expected balanced range. Only one ratio of $w_1$ to $w_2$ will satisfy this equality at both temperatures.

While there has been shown what is considered to be a preferred embodiment of the invention, it will be manifest that many changes and modifications may be made therein without departing from the essential spirit of the invention. It is in-

I claim:

1. In a method for processing a flowable substance wherein the substance moves through a processing region and wherein the passage of portions of the substance is delayed for periods of time through temporary retention of such portions by a sorbent;

the improvement in such method for minimizing any change in the overall retention time of said portions as a result of changes in temperature of the sorbent, said improvement comprising the steps of:

contacting the substance with a first sorbent material having a first predetermined characteristic variation of retention time with changes in temperature over a predetermined operating temperature range; and contacting the substance with a second sorbent material having a second predetermined characteristic variation of retention time with changes in temperature over said operating temperature range, said second characteristic variation being opposite to said first characteristic variation;

whereby the changes in retention time of said first sorbent material resulting from changes in operating temperature are effectively countered by opposing changes in retention time of said second sorbent material such that the overall retention time tends to remain relatively constant in the face of changes in temperature.

2. The method of claim 1, wherein the second sorbent material with which the substance is contacted comprises, at least when said temperature is in said operating range, two parts the relative proportions of which vary with temperature over said range.

3. The method of claim 2, wherein said two parts are two different components of a mixture; said components having different melting temperatures;

said mixture being of the class wherein the proportion of liquid to solid in the mixture varies with temperature, at least over said operating temperature range.

4. In a method for chromatographically separating two components of a mixture wherein the mixture is passed through a chromatographic processor having sorbent material for retaining said components for different periods of time respectively;

the improvement in such method for minimizing any change in the overall retention time of at least one of said components as a result of changes in temperature of the sorbent, said improved method comprising the steps of:

contacting the mixture with a first sorbent material having a first predetermined characteristic variation of retention time with changes in temperature over a predetermined operating temperature range; and contacting the mixture with a second sorbent material having a second predetermined characteristic variation of retention time with changes in temperature over said operating temperature range, said second characteristic variation being opposite to said first characteristic variation;

whereby the changes in retention time of said first sorbent material resulting from changes in operating temperature are effectively countered by opposing changes in retention time of said second sorbent material such that the overall retention time developed by said two sorbent materials tends to remain relatively constant in the face of changes in temperature.

5. In apparatus for processing a flowable substance by causing the substance to move past a first sorbent adapted to sorb portions of the substance so as to delay such portions for predetermined retention times, and wherein such retention times tend to vary with changes in temperature over an operating temperature range within which the processing is to be carried out;

the improvement in such apparatus comprising second sorbent material adapted to sorb such portions of said substance for retention times which vary with temperature, over said operating temperature range, oppositely to said variation with temperature experienced by said first sorbent material;

means to support said two sorbent materials with both subjected to the same temperature conditions; and means to direct the substance to be processed into operative contact with both said first and second sorbent materials to be sorbed thereby conjointly, whereby the temperature-responsive variations in retention times of said two sorbent materials oppose and tend to cancel one another so as to produce relatively constant overall retention times with changes in temperature within said operating temperature range.

6. Apparatus as claimed in claim 5, including column means supporting said first and second sorbent materials.

7. Apparatus as claimed in claim 6, wherein said sorbent materials are arranged serially, whereby said substance first contacts one of said materials and thereafter contacts the other material.

8. Apparatus as claimed in claim 6, wherein said two sorbent materials are supported in a composite arrangement providing for effectively simultaneous contact with said substance by both materials.

9. Apparatus as claimed in claim 5, wherein said second sorbent material is of the class which, at least when at a temperature within said operating range, includes two distinct parts having different retention time relationships with said substance, and wherein the relative proportions of said parts varies with changes in said temperature so as to alter the retention time effected by said second sorbent material with such changes in temperature.

10. Apparatus as claimed in claim 9, wherein said parts consist of at least two different components having different melting temperatures so as to result in varying proportions of solid to liquid with changes in temperature.

11. In chromatographic apparatus for separating two components of a flowable mixture by causing the mixture to move past a first sorbent adapted to sorb said components and to delay such components for different retention times reflecting characteristic relationships between the sorbent and the components to be separated, and wherein the retention time for at least one component tends to vary with changes in temperature over an operating temperature range within which the chromatographic separation is to be carried out;

the improvement in such apparatus comprising second sorbent material adapted to sorb said components and wherein the retention time for said one component varies with temperature, over said operating temperature range, oppositely to said variation with temperature experienced by said first sorbent material;

means to support said two sorbent materials with both subjected to the same temperature conditions; and means to direct the mixture to be chromatographically separated into operative contact with both said first and second sorbent materials to be sorbed thereby conjointly, whereby the temperature-responsive variations in retention times of said two sorbent materials oppose and tend to cancel one another so as to produce relatively constant overall retention times with changes in temperature within said operating temperature range.

12. Apparatus as claimed in claim 11, wherein said second sorbent material is of the class which, at least when at a temperature within said operating range, includes two distinct parts having different retention time relationships with said substance, and wherein the relative proportions of said parts varies with changes in said temperature so as to alter the retention time effected by said second sorbent material with such changes in temperature.

13. Apparatus as claimed in claim 12, wherein said parts consist of at least two different components having different melting temperatures so as to result in varying proportions of solid to liquid with changes in temperature.

* * * * *

UNITED STATES PATENT OFFICE
CERTIFICATE OF CORRECTION

Patent No. 3,628,310  Dated December 21, 1971

Inventor(s) John Howard Purnell

It is certified that error appears in the above-identified patent and that said Letters Patent are hereby corrected as shown below:

Column 10, line 68, after "$w_1 V_{g1}$" change the equal sign to a plus sign.

Signed and sealed this 17th day of October 1972.

(SEAL)
Attest:

EDWARD M. FLETCHER, JR.  ROBERT GOTTSCHALK
Attesting Officer  Commissioner of Patents